United States Patent [19]

Firma Carl Freudenberg et al.

[11] Patent Number: 4,834,351
[45] Date of Patent: May 30, 1989

[54] RUBBER SLEEVE SPRING

[76] Inventors: Firma Carl Freudenberg, Weinheim, Fed. Rep. of Germany; Giacomo Sciortino, Heidelberg, Fed. Rep. of Germany

[21] Appl. No.: 175,910

[22] Filed: Mar. 31, 1988

[30] Foreign Application Priority Data

May 21, 1987 [DE] Fed. Rep. of Germany ....... 3717026

[51] Int. Cl.$^4$ ............................................. F16F 13/00
[52] U.S. Cl. .................. 267/140.1; 248/562; 267/141.2; 267/219; 267/279
[58] Field of Search ............... 267/140.1, 140.5, 141.2, 267/154, 153, 35, 279, 214; 248/565, 636

[56] References Cited

U.S. PATENT DOCUMENTS

| | | | |
|---|---|---|---|
| 2,874,647 | 2/1959 | Candlin, Jr. | 267/35 |
| 3,698,703 | 10/1972 | Hipsher | 267/219 |
| 4,262,886 | 4/1981 | Le Salver et al. | 267/153 |
| 4,458,888 | 7/1984 | Wolf et al. | 267/140.1 |
| 4,630,803 | 12/1986 | Werner et al. | 267/219 |
| 4,705,410 | 11/1987 | von Broock | 267/141.2 |

FOREIGN PATENT DOCUMENTS

| | | | |
|---|---|---|---|
| 0234966 | 9/1987 | European Pat. Off. | 267/219 |
| 0010138 | 1/1986 | Japan | 267/279 |

*Primary Examiner*—Duane A. Reger
*Assistant Examiner*—Matthew C. Graham
*Attorney, Agent, or Firm*—Felfe & Lynch

[57] ABSTRACT

A rubber sleeve spring of two independently made parts each including two supporting sleeves one radially surrounding another, as well as a spring body of rubber joining the supporting sleeves and with two recesses corresponding to one another in the spring body. The two parts are so configured and assembled in a unit such that the recesses combine to form liquid-filled, sealed chambers which are in liquid-carrying communication with one another through a passage-like opening. The opening includes, in tandem, a first passage and a second passage of two branch passages which are connected parallel. The two branch passages differ from one another by having cross sections of different magnitude and/or different length and/or different cross-sectional variation over their length. They are preferably disposed in the plane of separation of the rubber sleeve spring.

6 Claims, 3 Drawing Sheets

RUBBER SLEEVE SPRING

The invention relates to a rubber sleeve spring.

A rubber sleeve spring is disclosed in German Pat. DE-PS No. 35 31 182. It has a good damping action only in a relatively narrow defined frequency range.

The invention is addressed to the problem of devising a rubber sleeve spring which will be of good effect in a much broader frequency range.

This problem is solved according to the invention defined by claim 1. The dependent claims relate to advantageous specific features.

In a rubber sleeve spring according to the invention, an opening joining two liquid-filled chambers has a first passage and a second passage in tandem, the second passage including at least two parallel branch passages which differ from one another in the different size of the cross section and/or different length and/or a different variation of cross section with respect to the particular length. The damping action thereby achieved is based on the fact that, depending on the frequency of the introduced vibrations, one liquid mass enters into resonant vibration which is contained in the first passage and one of the partial channels connected in series therewith.

If they differ even slightly from one another in regard to the magnitude of their cross section, their length and/or the cross-sectional variation over their length, the result will be a relatively harmonic transition, parallel to the varying frequency of the vibrations that are to be damped, between the damping effectiveness of the different branch passages, with the overall result that the frequency spectrum in which the achievement of a good damping action is obtained will undergo an appreciable expansion.

In accordance with the invention, a rubber sleeve spring comprises two independently made parts each including two supporting sleeves, one surrounding another radially. Each part includes a spring body of rubber connecting the supporting sleeves. Each part also includes two recesses corresponding to one another. The two parts are so configured and assembled that the recesses complement one another forming outwardly sealed, liquid-filled chambers. The spring also includes an opening of passage-like configuration providing liquid-carrying communication between the chambers. The opening has a first passage and a second passage disposed in tandem. The second passage has at least two parallel-connected branch passages and the branch passages differ from one another by at least one of: (a) a different-from-one-another size of the cross section, (b) a different-from-one-another length, and (c) a different-from-one-another cross-sectional variation with respect to the length in each case.

For a better understanding of the invention, together with other and further objects thereof, reference is made to the following description, taken in connection with the accompanying drawings, and its scope will be pointed out in the appended claims.

Referring now to the drawings.

Figure 1:
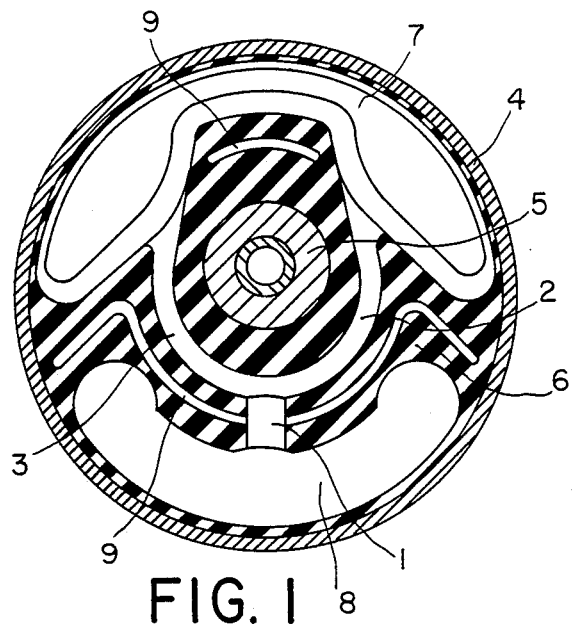
FIG. 1 is a cross section of an embodiment of a rubber sleeve spring according to the invention.
Figure 2:
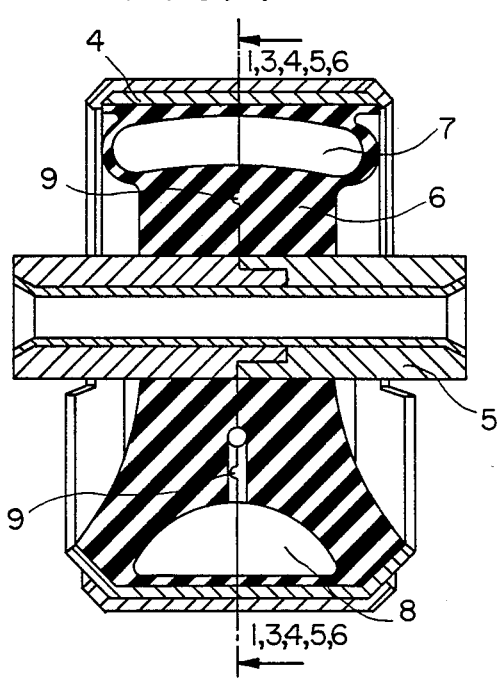
FIG. 2 is a longitudinal section of the rubber sleeve spring of FIG. 1.

Referring now more particularly to FIGS. 1 and 2, the rubber sleeve spring shown in FIGS. 1 and 2 comprises two individual parts made independently of one another, which are assembled in the plane A—A (FIG. 2) to form the unit ready for use. They thus contain each a certain part of the supporting sleeves 4 and 5 radially disposed one inside the other, and of the spring body 6 of rubber. They are assembled in the manner represented, to form the unit ready for use, and care must be taken, by appropriate measures in the area of the supporting sleeves 4 and 5, to prevent the liquid contained in the chambers 7 and 8 from escaping. The chambers 7 and 8 are connected by a passage-like opening which includes, in addition to the first passage 1, the branch passages 2 and 3 connected in series therewith and parallel to one another. The latter differ from one another by a cross-sectional size differing by no more than 25%, whereby it becomes possible to damp undesirable vibrations in the relatively wide frequency range from 5 to 15 Hz. Grooves 9 receive corresponding sealing ribs.

Figure 3:
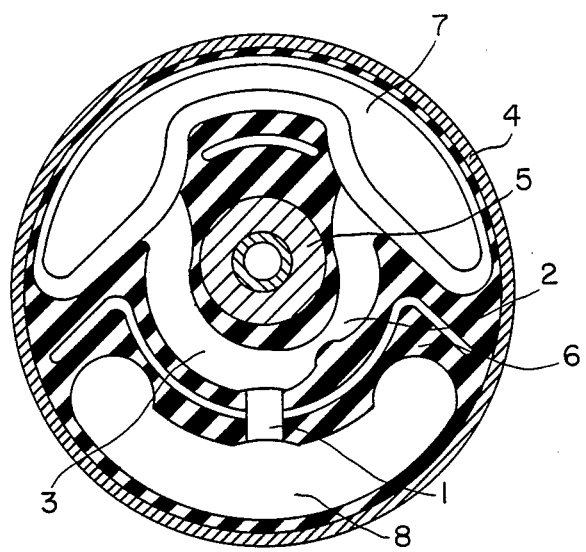
FIGS. 3-6 are cross sections of other embodiments of a rubber sleeve spring according to the invention.
Figure 4:
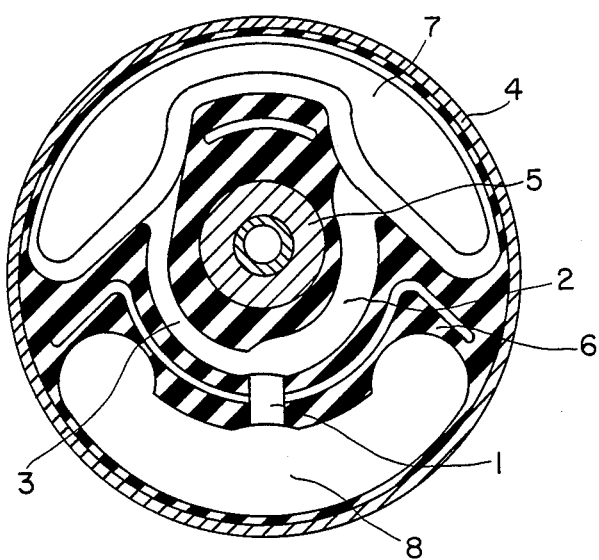
Figure 5:
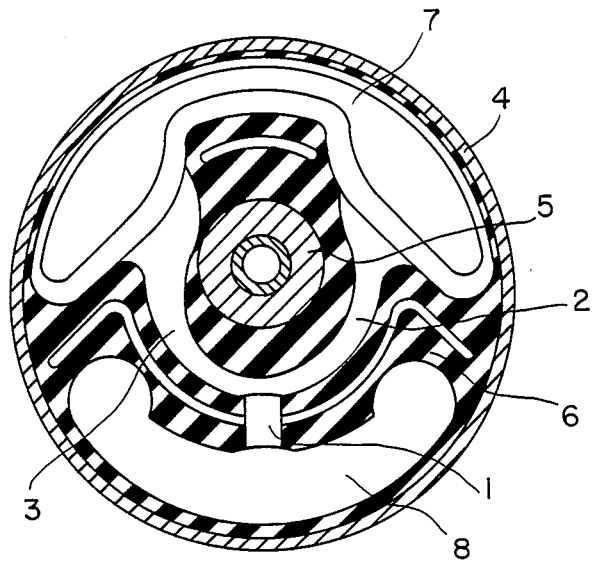
Figure 6:
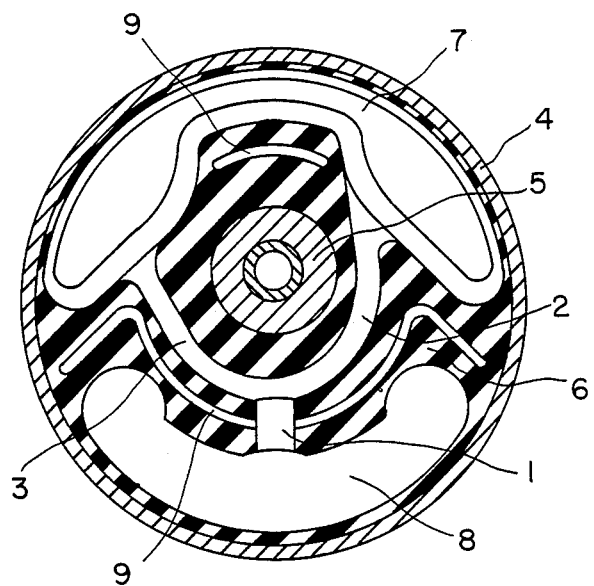

Referring to FIGS. 6, 3 and 5 a similar effect can be achieved when the two branch passages 2 and 3 have a length differing from one another in the above-stated order of magnitude and/or in the change of cross section over their length. Referring to FIG. 4, a similar effect can be achieved when the two branch passages 2 and 3 have a different-from-one-another size of cross section.

Also, a pinch valve can be provided between the branch passages 2 and 3 and the chamber 7 and/or between the first passage 1 and the chamber 8, which is closed in the state of rest and has sealing lips in the plane of separation which are pressed resiliently against one another, and which separate from one another in the event of increasing differential pressures in the chambers 7 and 8 and produce a pressure equalization. The sealing lips can be configured with particular precision in their association with the plane of separation of the rubber sleeve spring, and it is also possible to establish precisely the bias and with it the opening pressure.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Rubber sleeve spring, comprising:
two independently made parts each including two supporting sleeves, one surrounding another radially, each part including a spring body of rubber connecting said supporting sleeves, and each part including two recesses corresponding to one another, said two parts being so configured and assembled that said recesses complement one another forming outwardly sealed, liquid-filled chambers, an opening of passage-like configuration providing liquid-carrying communication between said chambers, said opening having a first passage and a second passage disposed in tandem, said second passage having at least two parallel-connected branch passages, each having one end opening into said first passage and each having a second end opening into the same one of said chambers, and said branch passages differing from one another by at least one of:

(a) a different-from-one-another size of the cross section, (b) a different-from-one-another length; and (c) a different-from-one-another cross-sectional variation with respect to the length in each case.

2. Rubber sleeve spring according to claim 1, in which said first and second passages are formed as a recess by merging one passage with another, and that said latter recess is surrounded circumferentially by both spring bodies together.

3. Rubber sleeve spring according to claim 2, in which said latter recess is substantially surrounded by said chambers of both spring bodies.

4. Rubber sleeve spring according to claim 3, in which said substantially surrounded latter recess has a profile which is centrally associated with a contact surface of both spring bodies.

5. Rubber sleeve spring according to claim 4, in which said chambers of both spring bodies have a circularly defined profile.

6. Rubber sleeve spring according to claim 1, in which a pinch valve is provided at the mouth of at least one of said first passage and said branch passages of said second passage.

* * * * *

UNITED STATES PATENT AND TRADEMARK OFFICE
CERTIFICATE OF CORRECTION

PATENT NO. : 4,834,351

DATED : May 30, 1989

INVENTOR(S) : Giacomo Sciortino

It is certified that error appears in the above-identified patent and that said Letters Patent is hereby corrected as shown below:

In the heading at page 1, column 1 for "Inventors: Firma Carl Freudenberg, Weinheim, Fed. Rep. of Germany; Giacomo Sciortino, Heidelberg, Fed. Rep. of Germany" should read -- Inventor: Giacomo Sciortino, Heidelberg, Fed. Rep. of Germany --.

-- Assignee: Firma Carl Freudenberg, Weinheim/Bergstr, Fed. Rep. of Germany --.

Item [19] "Firma Carl Freudenberg et al" should read --Sciortino--

Signed and Sealed this

Twentieth Day of February, 1990

*Attest:*

JEFFREY M. SAMUELS

*Attesting Officer*   *Acting Commissioner of Patents and Trademarks*